(12) United States Patent
Ufkes et al.

(10) Patent No.: US 10,984,618 B2
(45) Date of Patent: *Apr. 20, 2021

(54) KEYLESS PUCK LOCK APPARATUS AND SYSTEM

(71) Applicant: Security Enhancement Systems, LLC, Northbrook, IL (US)

(72) Inventors: Philip J. Ufkes, Sullivans Island, SC (US); Matthew Frank Trapani, Deerfield, IL (US)

(73) Assignee: Security Enhancement Systems, LLC, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,553

(22) Filed: Mar. 2, 2020

(65) Prior Publication Data
US 2020/0273269 A1    Aug. 27, 2020

Related U.S. Application Data

(63) Continuation of application No. 16/103,554, filed on Aug. 14, 2018, now Pat. No. 10,580,237, which is a
(Continued)

(51) Int. Cl.
*G07C 9/00* (2020.01)
*H04W 4/80* (2018.01)
(Continued)

(52) U.S. Cl.
CPC .......... *G07C 9/00309* (2013.01); *E05B 67/36* (2013.01); *E05C 19/08* (2013.01);
(Continued)

(58) Field of Classification Search
CPC ............ G07C 9/00309; G07C 9/00571; G07C 2009/00642; G07C 2009/00769;
(Continued)

(56) References Cited

U.S. PATENT DOCUMENTS 9,881,749 B1 * 1/2018 Griffin .................. E05B 63/143
2007/0290789 A1 * 12/2007 Segev ................. E05B 47/0657
340/5.6

(Continued)

*Primary Examiner* — Nabil H Syed
(74) *Attorney, Agent, or Firm* — Gregory Finch; Finch Paolino, LLC

(57) ABSTRACT

A keyless puck lock system with wireless communications and power interface. Embodiments of the present disclosure provide a keyless puck lock system enabling a low cost and high security solution that is difficult to tamper with and defeat. In the preferred embodiment of the present invention, the system uses a keyless puck lock assembly that includes a hasp assembly and a keyless lock mechanism that does not require any physical mechanical keys so that it does not have a mechanical cylinder inserted therein to lock or unlock the puck lock. Accordingly, the keyless puck lock system in accordance with one or more embodiments of the present invention does not have a physical keyway which is a security attack point that is included in conventional hockey puck-type locks.

20 Claims, 9 Drawing Sheets

Related U.S. Application Data continuation-in-part of application No. 13/414,348, filed on Mar. 7, 2012, now Pat. No. 10,089,811.

(60) Provisional application No. 61/450,185, filed on Mar. 8, 2011.

(51) Int. Cl.

| | | |
|---|---|---|
| *E05C 19/08* | (2006.01) | |
| *G06F 21/00* | (2013.01) | |
| *E05B 67/36* | (2006.01) | |
| *E05B 17/00* | (2006.01) | |
| *E05B 47/00* | (2006.01) | |
| *H04W 12/08* | (2021.01) | |

(52) U.S. Cl.
CPC .............. *G06F 21/00* (2013.01); *H04W 4/80* (2018.02); *E05B 17/0016* (2013.01); *E05B 47/0004* (2013.01); *E05B 2047/0057* (2013.01); *E05B 2047/0069* (2013.01); *E05B 2047/0094* (2013.01); *G07C 9/00571* (2013.01); *G07C 2009/00642* (2013.01); *G07C 2009/00769* (2013.01); *H04W 12/08* (2013.01)

(58) Field of Classification Search
CPC .. E05B 67/36; E05B 17/0016; E05B 47/0004; E05B 2047/0057; E05B 2047/0069; E05B 2047/0094; E05C 19/08; H04W 4/80; H04W 12/08
See application file for complete search history.

(56) References Cited

U.S. PATENT DOCUMENTS

| | | | |
|---|---|---|---|
| 2008/0141745 A1* | 6/2008 | Rohde | E05B 67/38 70/455 |
| 2010/0328031 A1* | 12/2010 | Powers | G08B 25/10 340/5.64 |
| 2011/0050391 A1* | 3/2011 | Denison | G07F 7/1008 340/5.51 |
| 2017/0247914 A1* | 8/2017 | Waugh | E05B 81/08 |
| 2018/0160835 A1* | 6/2018 | Garrity | G07F 17/12 |
| 2019/0251831 A1* | 8/2019 | Wheeler | H04L 12/10 |
| 2019/0363564 A1* | 11/2019 | Chen | H02J 7/025 |

* cited by examiner

KEYLESS PUCK LOCK APPARATUS AND SYSTEM

CROSS REFERENCE TO RELATED APPLICATIONS

The present patent application is a continuation of U.S. patent application Ser. No. 16/103,554 filed on Aug. 14, 2018, entitled "KEYLESS PUCK LOCK APPARATUS AND SYSTEM" and assigned to the assignee of the present invention, said application being a continuation-in-part of U.S. patent application Ser. No. 13/414,348 filed on Mar. 7, 2012, now U.S. Pat. No. 10,089,811, entitled "LOCK" and assigned to the assignee of the present invention, said application claiming the benefit of U.S. provisional application Ser. No. 61/450,185, filed on Mar. 8, 2011; each of these applications being hereby incorporated by reference in their entireties.

FIELD

The present disclosure relates to the field of access control systems; in particular, a keyless puck lock system with a wireless communications and wireless power interface.

BACKGROUND

Many different types of enclosures are secured by a locking system wherein a conventional padlock is mounted onto some sort of hasp assembly to secure access to an enclosed area such as a shelter, lockbox, cargo container, refrigerators, commercial trucks, cabinet, gate, generators, trailers, etc. A non-limiting example of one such lock is known as a "hockey puck" lock or puck lock that is referred to as a hidden shackle padlock in the portable security industry. One high security locking assembly includes a hockey puck lock that is mounted on a portable security hasp assembly. The hidden shackle bolt projects and retracts through the hasp to secure the hockey puck lock onto the hasp when a user throws and retracts the bolt by turning a mechanical key to lock and unlock the lock. Mechanical keys are a disadvantage as it is difficult to administer key control without implementing a complex key management system. If a company has a significant amount of locks in their inventory across many different locations, this key control administration is very difficult and costly especially in the case of lost or stolen keys. It is common to have a unique key for each lock which creates significant maintenance issues when another person needs to open the lock.

Another disadvantage of using physical keys in a lock system is that the level of security is compromised by having a mechanical locking cylinder with an opening for the key. Many security experts consider such an opening a significant security flaw in a locking system. In a lock with an opening for a mechanical key, common cylinders are easily broken into with a standard hand drill, thereafter allowing a person to easily rotate the shackle and unlock the lock.

Based on the current state of the art with hockey puck locking systems and the many disadvantages associated therewith, there is a need for a keyless "smart" puck lock that provides a high level of security at a relatively low cost without any opening for a physical mechanical key. Such a smart puck lock also minimizes exposure of the components, particularly the keyway and the internal components of the lock, to moisture or other contaminants, and minimizes corrosion or oxidation of metallic lock components.

There is also a need for a relatively simple, easy-to-use, reliable and compact electronic access control puck locking portable security system that includes the ability to manually override the electronic lock.

There is further a need for a compact and flexible locking system that can be installed on many different doors that can be locked and unlocked using an electronic device via a wireless signal.

Through applied effort, ingenuity, and innovation, Applicant has identified and improved a number of deficiencies and problems with wireless access control systems. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

A keyless puck lock apparatus comprising a housing having a planar face surface, a side wall disposed around a circumference of the planar face surface, and a planar rear surface having a substantially oblong aperture defining a window; a locking assembly operably disposed in an interior portion of the housing, the locking assembly comprising a locking bolt, a spring, and a bolt stop, the locking bolt extending through an aperture of the side wall when configured in an unlocked position and defining a flush interface with the aperture of the side wall when configured in a locked position; an electronic latching mechanism operably engaged with the locking assembly to selectively engage the locking bolt to define a locked state of the locking assembly, and to selectively disengage the locking bolt to define an unlocked state of the locking assembly; an electronic control module operably engaged with the electronic latching mechanism, the electronic control module comprising circuitry to transmit an electrical signal to the electronic latching mechanism, a microprocessor, and a wireless communications chipset; and, a power source operably engaged with the electronic control module and the electronic latching mechanism.

Another object of the present disclosure is a keyless puck lock system comprising a hasp assembly comprising a first hasp section and a second hasp section, the first hasp section having a first hasp plate, a first surrounding shroud, a first bolt aperture, and a first radio frequency/infrared (RF/IR) circuit board disposed on a proximal portion of the first hasp plate, the second hasp section having a second hasp plate, a second surrounding shroud, and a second bolt aperture; and, a puck lock selectively secured to the first bolt aperture and the second bolt aperture, the puck lock comprising a housing having a planar face surface, a side wall disposed around a circumference of the planar face surface, and a planar rear surface having a substantially oblong aperture defining a window; a locking assembly operably disposed in an interior portion of the housing, the locking assembly comprising a locking bolt, a spring, and a bolt stop, the locking bolt extending through an aperture of the side wall when configured in an unlocked position and defining a flush interface with the aperture of the side wall when configured in a locked position; an electronic latching mechanism operably engaged with the locking assembly to selectively engage the locking bolt to define a locked state of the locking assembly, and to selectively disengage the locking bolt to define an unlocked state of the locking assembly; an electronic control module operably engaged with the electronic latching mechanism, the electronic control module comprising circuitry to transmit an electrical signal to the electronic latching mechanism, a microprocessor, and a wireless communications chipset; and, a battery operably engaged with the electronic control module and the electronic latching mechanism.

Yet another object of the present disclosure is a keyless puck lock system comprising a hasp assembly comprising a first hasp section and a second hasp section, a first wireless power interface, and a first communications interface; a puck lock operably engaged with the hasp assembly, the puck lock comprising a lock assembly, a control module, a second communications interface, a second wireless power interface, and a battery; a first computing device communicably engaged with the control module of the puck lock via a wireless communications network, the first computing device configured to send communications to and receive communications from the control module of the puck lock; and, a remote server communicably engaged with the first computing device over the wireless communications network.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
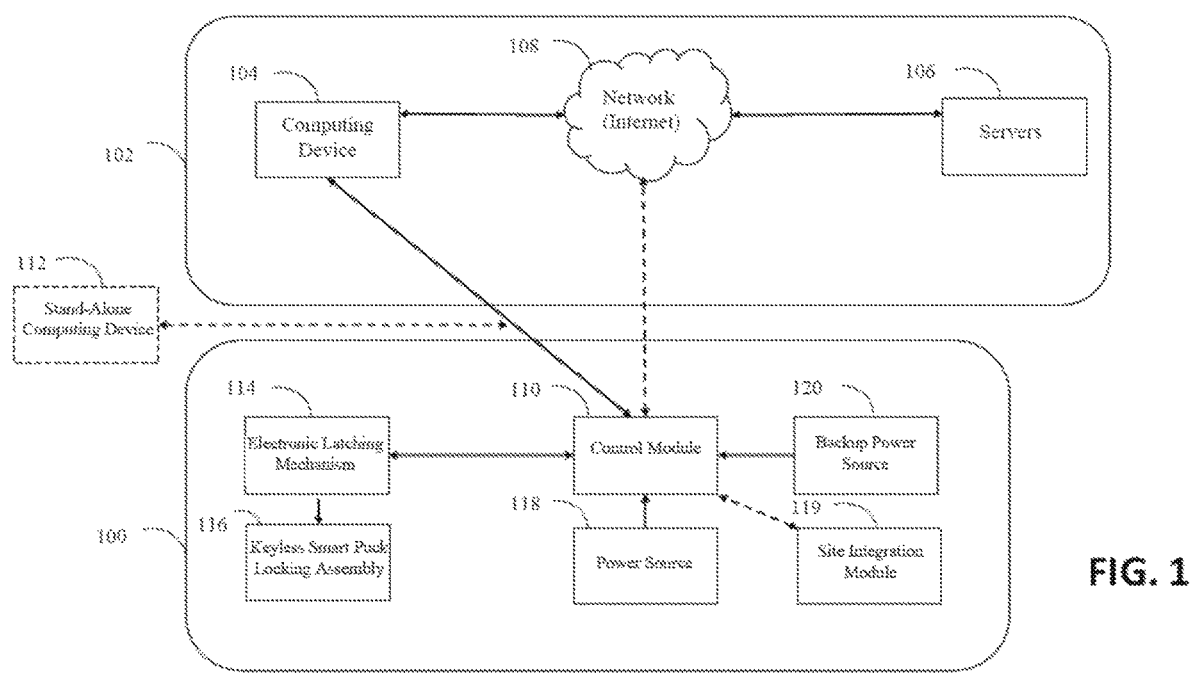
FIG. 1 is a system diagram of a puck lock system, according to an embodiment of the present disclosure.

Exemplary embodiments are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import.

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

One or more embodiments of the present invention provide a keyless "smart" puck lock system that is a relatively low cost and high security solution that is difficult to tamper with and defeat. In the preferred embodiment of the present invention, the system uses a keyless puck lock assembly that includes a hasp assembly and a keyless lock mechanism that does not require any physical mechanical keys so that it does not have a mechanical cylinder inserted therein to lock or unlock the puck lock. Accordingly, the keyless puck lock system in accordance with one or more embodiments of the present invention does not have a physical keyway which is a security attack point that is included in conventional hockey puck-type locks.

In the present invention, a "hasp" is a plate generally made of metal that may be comprised of a single piece or multiple pieces that is adapted to be fastened to an enclosure substrate (e.g., door, cover, lid, etc.) and further adapted to receive a locking mechanism for locking entry to the enclosure. The hasp may comprise a fixed configuration or a hinged configuration. In a hinged configuration the hasp may pivot on an axis such that the hasp is operable to secure a door or angled access point. According to an embodiment, a hasp having a hinged configuration may comprise either a single hinge configuration or a double hinge configuration.

FIG. 1 is an exemplary illustration of a general overview of the system architecture for implementing one or more embodiments of the present invention. As indicated above, smart puck lock system 100 is a network-enabled system that is networked through a communications network 102 via a computing device 104 to operate lock system 100.

As illustrated in FIG. 1, an exemplary method of implementing the system architecture for communications network 102 is to provide one or more Internet-enabled computing devices 104 such as a laptop or a mobile device such as a smartphone which are networked with one or more servers 106 via a network/Internet 108 that communicates with a control module 110 of lock system 100.

Servers 106 and computing devices 104 are well known and used extensively for networking. Network/Internet 108 may be one of many conventional, well-known network systems including those that package data using well-known methodologies into one of several formats (using one or more packets) for communications between networked devices.

It should be noted that any one of the one or more embodiments of the present invention may be implemented in other well-known types of system architecture (or processing environments capable of supporting the methodologies of the various embodiments of the present invention) such as, for example, peer-to-peer architecture, internet, client/server, hybrid of both, etc. Client/server, peer-to-peer, or hybrid combination environments, database and or application servers, and networks or networking in general, including a large variety of protocols used for communication and control, translations of signals, and so on are very well documented in various technical, trade, and patent literature.

Further, it should be noted that any one of the one or more embodiments of the present invention may also be implemented as a standalone device. For example, a stand-alone computing device 112 such as a mobile smartphone may also directly communicate with the conventional control module 110 using Bluetooth, Low Energy Bluetooth, Near Field Communications (NFC), WiFi, LORA, cellular, and other known protocols in lock system 100 without requiring communications network 102.

Regardless of whether devices 104 or 112 are networked or standalone, upon receipt of unlock transmission signal (i.e., data packet recognized by control module 110), an electronic latching mechanism 114 is actuated from a latched position to an unlatched position, which enables a user to actuate a keyless smart puck locking assembly 116 from a locked position to an unlocked position. Control module 110 transmits an electrical signal (e.g., a 12 V signal) for actuating electronic latching mechanism 114. Various other well-known communications protocols may be used between the computing device 104 and control module 110 including for example Bluetooth, near field communication (NFC), GPS, cellular, Bluetooth low energy (BLE), and the like, which may also include well-known existing encryption technologies to secure communications.

In the preferred embodiment of the present invention, a power source 118 provides power to control module 110. Power source 118 may include one or more Alternative Current (AC) sources, Direct Current (DC) sources such as one or more batteries, combinations of both, including use of well-known uninterruptible power supply (UPS) systems. In general, latching mechanism 114 may include a latch member driven by a solenoid. Further, the manner of delivery of power to latching solenoid for operation and control may be accomplished by a variety of mechanisms or systems, including wired, wireless, network based, etc. Lock system 100 optionally includes a site integration module 119 in communication with control module 110 using well-known communication protocols such as CAN, Bluetooth, BTLE, WiFi, LORA, cellular, serial, binary switching, SNMP, etc. Integration module 119 interfaces to various security alarms, environmental alarms, networking alarms, gas gauge alarms, video cameras, perimeter security and other related systems.

For example, well-known computing devices (e.g., a mobile computing device such as a mobile phone) using well known Bluetooth, Near Field Communication (NFC), or other well-known technologies (e.g., location based systems) may be used to activate a control module to power latching mechanism, which would provide a keyless (wired or wireless) operation. For example, lock system 100 in accordance with one or more embodiments of the present invention may comprise of a well-known Bluetooth module powered by an internal battery or other power source that may receive control signals from a mobile device in well-known manner to enable supply of power to a latching mechanism such as a solenoid.

Lock system 100 may optionally include a backup power source 120 to directly power control module 110 in case of complete failure of power source 118 (including UPS systems). Backup power source 120 may be directly wired to control module 110 with terminals outside of the enclosure to provide power to control module 110. Once control module 110 has power, it is able to receive control signals and data from computing device 104 to actuate latching mechanism 114.

Figure 2:
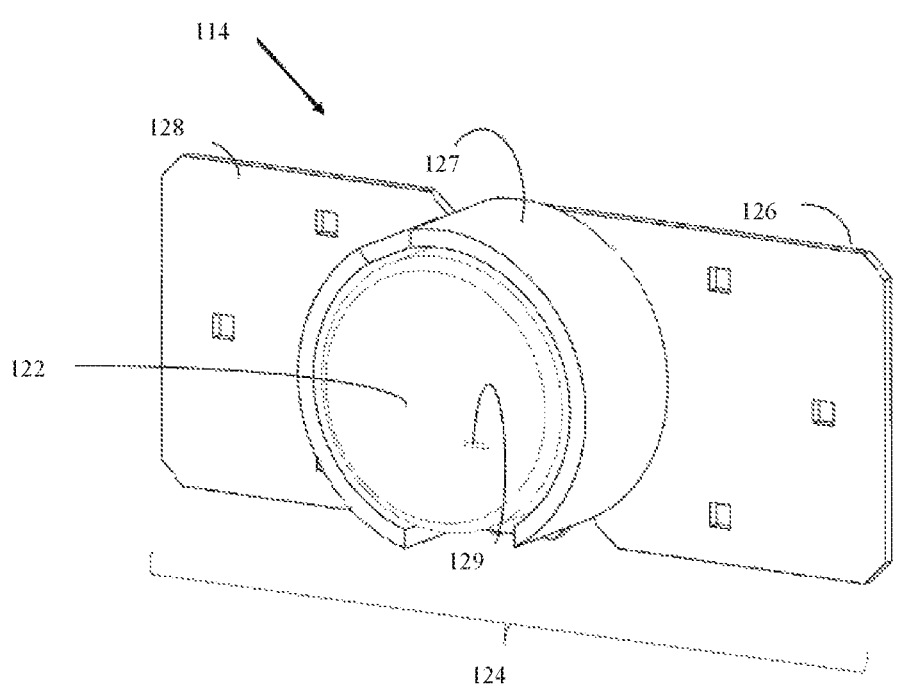
FIG. 2 is a perspective view of a puck lock system, according to an embodiment of the present disclosure.

FIGS. 2-11 are non-limiting, exemplary illustrations of keyless smart puck lock system 100 in accordance with one or more embodiments of the present invention. As illustrated in FIG. 2 and further detailed below, one or more non-limiting, exemplary embodiments of the present invention provide keyless puck lock system 100 that may be mounted onto an enclosure substrate. System 100 includes an electronic latching mechanism comprising an electronic puck lock 122 that is mounted and interlocks with a hasp 124 having a first hasp section 126, a protective shroud 127, and a second hasp section 128. Protective shroud 127 surrounds puck lock 122 and provides a metal protective barrier to further secure lock 122 from outside break attempts to break into an enclosure.

Puck lock 122 further includes a slit 129 that functions as a LED indicator and/or a RF slit. Slit 129 acting as a LED indicator notifies users of specific events such as indicting whether a circuit board in lock 122 is powered on, whether the circuit board has a fault, if there is an unlock or lock event, whether lock 122 is actively communicating and transmitting data, a low battery condition, etc. Slit 129 acting as a RF window allows a Bluetooth wireless signal to pass through the metal housing of lock 122 and surrounding shroud 127. In addition to functioning as a pathway through which a Bluetooth wireless signal can pass, slit 129 may also serve as a pathway for other wireless frequencies. For example, slit 129 may facilitate bidirectional transmission of radio frequency or other electromagnetic frequency.

As indicated above, hasp 124 protects the enclosure from entry while in a lock position and shroud 127 of hasp 124 protects puck lock 122 from possible attack (by prying, application of torque, etc.).

Figure 3:
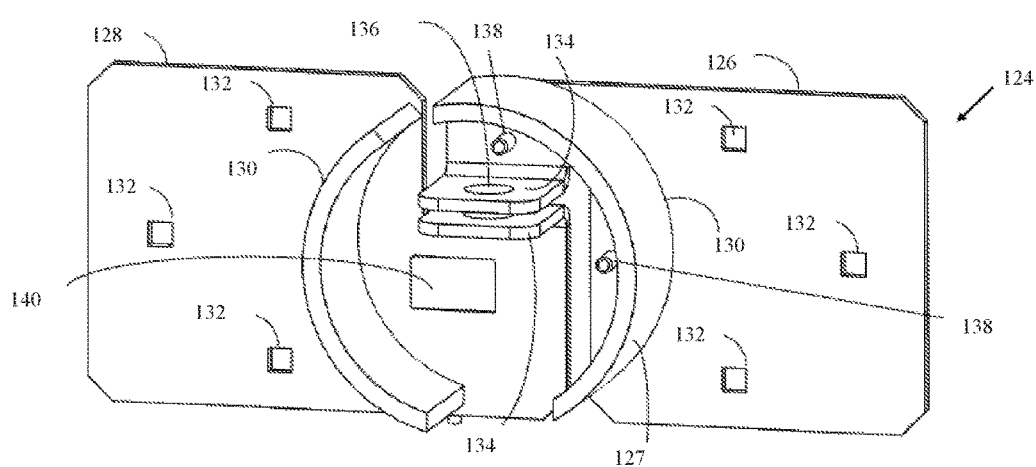
FIG. 3 is a perspective view of a hasp assembly of a puck lock system, according to an embodiment of the present disclosure.
Figure 4:
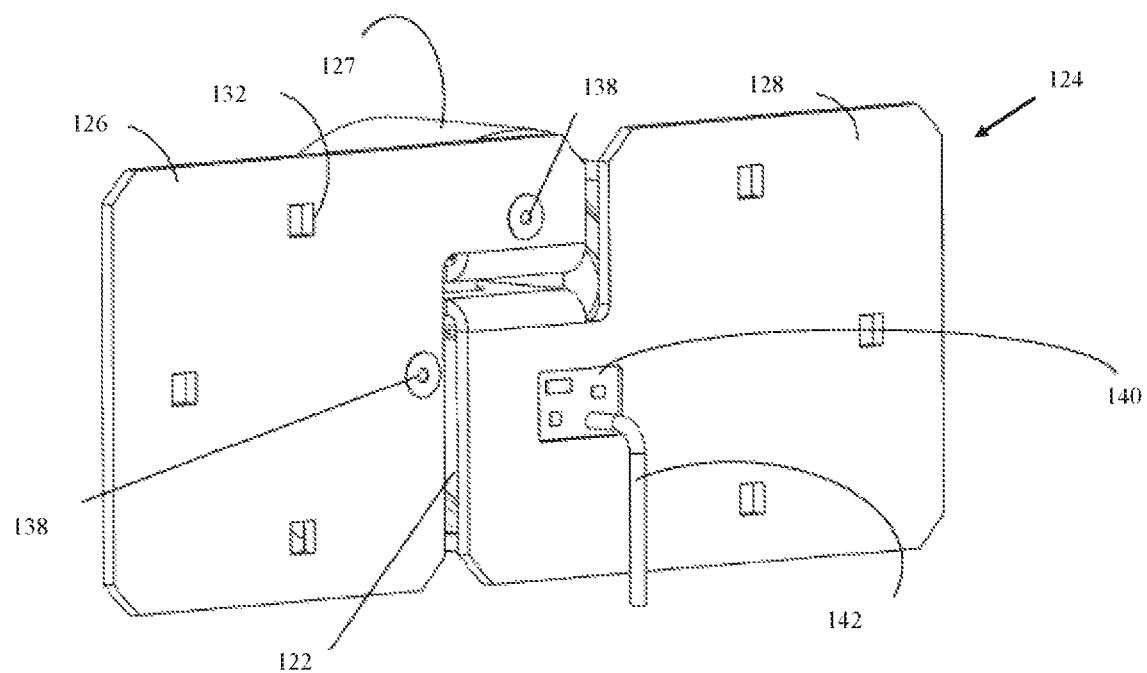
FIG. 4 is a rear perspective view of a hasp assembly of a puck lock system, according to an embodiment of the present disclosure.

As illustrated in FIGS. 3 and 4, puck lock 122 detachably engages with hasp 124 and as further detailed below, is latched to locked position by a latching mechanism, which provides a secondary locking strength of lock system 100. The disengagement or unlatching of the latching mechanism frees puck lock 122 to be rotated to an unlocked position. Once rotated to an unlocked position, puck lock 122 may be removed from hasp 124 to enable access to the enclosure interior. According to an embodiment, hasp 124 may comprise a hinge such that hasp 124 may be rotated about a hinged axis to enable access to the enclosed interior.

Hasp 124 may be comprised of metal or alloys thereof such as steel or other strong metal such as aluminum that provide reinforcement for added structural integrity in terms of structural strength to which hasp 124 is physically, mechanically connected such as a wall, door, lid or cabinet.

As further detailed below, both hasp plates 126 and 128 along with surrounding shroud 127 provide a barrier to limit access to puck lock 122. Access is limited to surfaces of puck lock 122 against physical attack by application of levered and or torque force. For example, if a rigid bar is used to apply a levered force, one end of that rigid bar must somehow be mechanically contacted with a surface of the interlock mechanism to provide sufficient force to pry out the interlock mechanism. As another example, if a torque force is applied to rotate the interlock mechanism, then the tool used to apply the torque force must somehow mechanically contact with a surface of the interlock mechanism.

In the preferred invention, surrounding shroud 127 comprises a pair of shrouds 130 that strategically surround lock 122, thereby providing very limited physical access to surfaces that may potentially be used to apply forces, for example levered or torque forces. Of course, shrouds 130 provide sufficient access to puck lock 122 to allow for mounting and removal of lock 122 without the use of tools. Users can grasp onto puck lock 122 and properly mount and unlock/lock puck lock 122, and dismount puck lock 122, but little room is provided to fit any type of tool to access lock 122.

As illustrated in FIGS. 3-4, first hasp plate 126 and second hasp plate 128 each include a series of mounting holes 132 to attach plates 126 and 128 to an enclosure substrate. Each hasp plate 126 and 128 further includes a hasp portion 134 with apertures 136 that align vertically for a bolt of puck lock 122 to pass therethrough. Hasp portions 134 are integrally formed with first hasp plate 126 and second hasp plate 128.

In the preferred embodiment of the invention, lock 122 is seated within surrounding protective shroud 127 and a locking bolt in lock 122 is inserted through apertures 136 to lock puck lock 122 onto plates 126 and 128. According to an embodiment, plates 126 and 128 may be rotatably coupled via the use of a hinge. Lock 122 may be either fully detached from plates 126 and 128, or alternatively, lock 122 may be permanently affixed to one of the plates for convenience. For example, in an embodiment where plates 126 and 128 are rotatably coupled via the use of a hinge, lock 122 may be mounted and secured to plate 126 using a pair of mounting screws 138 projecting outwardly from the surface of plate 126. Screws 138 engage a pair of threaded bores 144 (FIG. 5) formed on the rear side of lock 122. Once screws 138 are inserted into corresponding threaded bores 144 on lock 122, lock 122 is permanently attached to hasp 126.

In the preferred embodiment of the current invention, hasp 124 can be configured to simply support a mechanical puck lock or an electronic smart puck lock. Hasp 124 may optionally include a combination RF/IR circuit board 140 that is covered with an epoxy to provide protection from moisture, debris and force while being able to transmit/receive data and power. Board 140 provides power with RF and data transmission via RF/IR to and from the puck lock 122 communicating various events between the puck lock and the site.

When lock 122 is secured on hasp 124, RF/IR circuit board 140 directly communicates with lock 122 based on close proximity of board 140 to a RF/IR circuit board 146 (FIG. 5) embedded within lock 122 with direct line of sight. Positioning of lock 122 within surrounding shroud 127 of hasp 124 ensures consistent placement/distance and alignment of RF/IR circuit board 146 of lock 122 with RF/IR circuit board 140 on hasp 124.

In conventional use, it would be difficult to use a puck lock to secure enclosures that contained wires. The preferred embodiment of the current invention addresses this issue by providing puck lock 122 with wireless power and data transmission for easier, quicker and more reliable connections between an enclosure door and lock 122. Hasp 124 serves as the protected wireless connection point for portable security puck lock 122 to directly wirelessly power lock 122 and wirelessly transmit data to and from lock 122. As illustrated in FIG. 4, a power and data transmission cable 142 is attached to RF/IR circuit board 140 of hasp 124 to power transmission circuit board 140 and communicate with puck lock 122.

Figure 5:
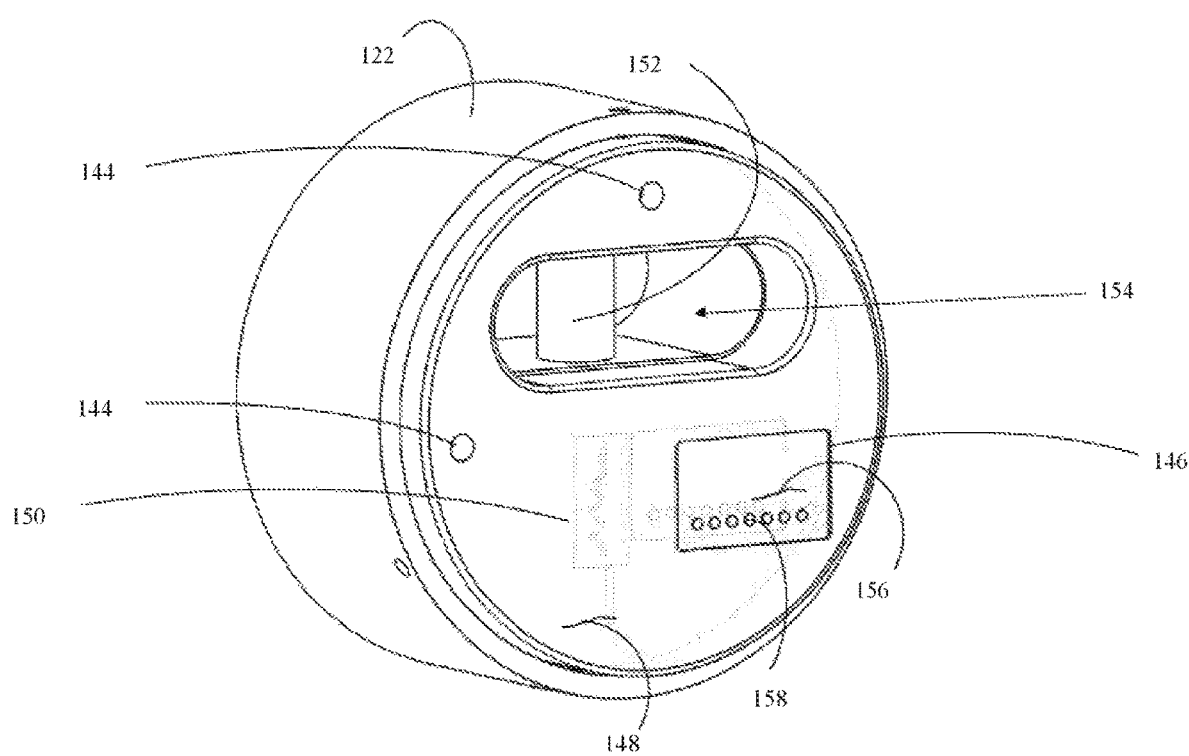
FIG. 5 is a rear perspective view of a puck lock assembly, according to an embodiment of the present disclosure.

FIG. 5 illustrates a back side 148 of smart puck lock 122 including threaded bores 144 to permanently attach lock 122 to hasp 124. A top surface 156 of RF/IR circuit board 146 is planar with back surface 148 of lock 122 wherein RF/IR circuit board 146 is encased with epoxy to protect board 146. Board 146 may also include a set of mechanical contact points 158 that align with mechanical contact points on hasp 124. Contact points 158 may be used to transmit power and data to lock 122.

As described above, board 146 aligns with board 140 for direct line of sight for power and data transmission. A locking bolt 152 retractably passes through a window 154 formed through the body of lock 122. A heating element 150 with an integral resistive temperature device (RTD) is inside the body of lock 122 to selectively heat the battery and mechanical components inside lock 122 when the temperature threshold is exceeded so the battery and locking mechanisms continue to function as designed without malfunctioning due to freezing temperatures, ice, moisture, etc.

Figure 6:
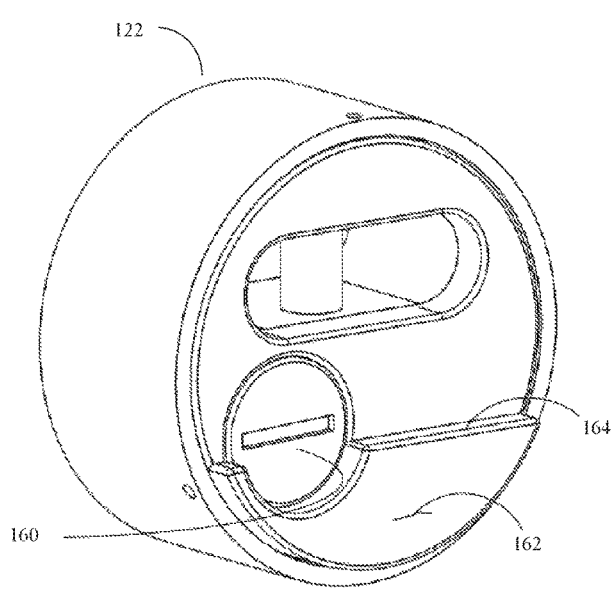
FIG. 6 is a rear perspective view of a puck lock assembly, according to an embodiment of the present disclosure.
Figure 7:
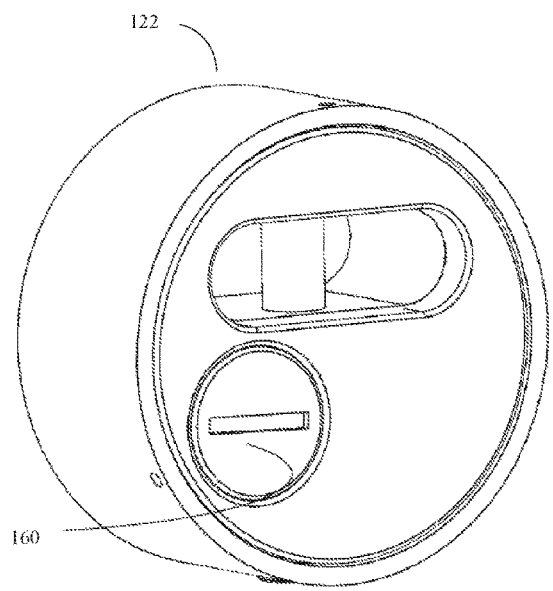
FIG. 7 is a rear perspective view of a puck lock assembly, according to an embodiment of the present disclosure.

FIGS. 6-7 illustrate lock 122 powered by a battery 170 (FIG. 9) seated within a cavity within lock 122. The lock battery 170 is replaced by removing a battery door 160. Lock 122 further includes a stepped rear plate 162 having a shelf 164 with a carve out portion for removal of battery door 160 to replace lock batteries. FIG. 7 illustrates a battery-powered lock 122 without the stepped rear plate 162 with shelf 164. Stepped rear plate 162 allows puck lock 122 to secure to a conventional padlock hasp designed to receive a traditional padlock U-shaped shackle. In the current embodiment of the present invention, lock 122 is configured to receive interchangeable rear plates including plates with a shelf 164, a RF/IR circuit board 146 and a battery door 160 (with no shelf 164).

Figure 8:
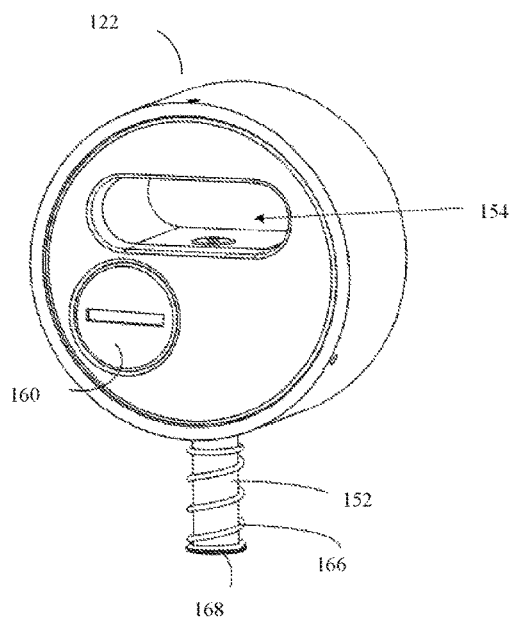
FIG. 8 is a rear perspective view of a puck lock assembly in an unlocked configuration, according to an embodiment of the present disclosure.
Figure 9:
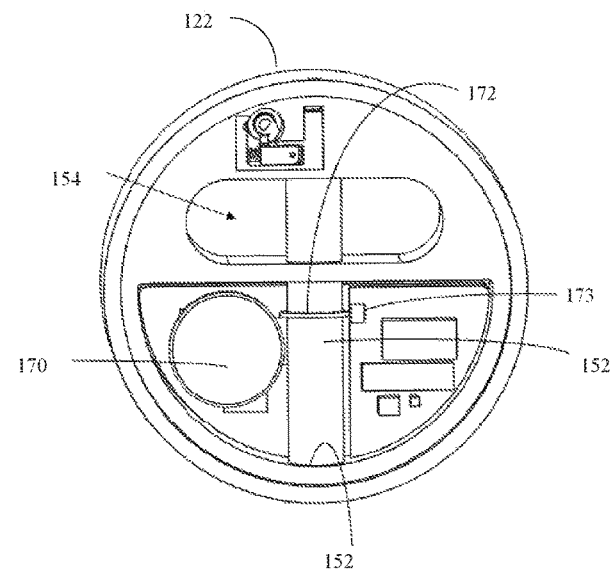
FIG. 9 is a cross-sectional view of a puck lock assembly, according to an embodiment of the present disclosure.

FIG. 8 illustrates lock 122 in an unlocked state and FIG. 9 illustrates lock 122 in a locked state. In particular, when lock 122 is in an unlocked state, lock bolt 152 protrudes out the bottom of lock 122. A spring 166 is wound around the bottom portion of lock bolt 152 to positively bias bolt 152 away from lock 122. Lock 122 is locked by pushing on an end cap 168 of bolt 152 in an upward direction towards lock 122 against the force of spring 166. As illustrated in FIG. 9, a stop 172 limits the extension of lock bolt 152 out of lock 122. Stop 172 may also be formed as a magnetic ring around bolt 152 that passes by a Hall effect sensor 173 to indicate the state or position of bolt 152.

Figure 10:
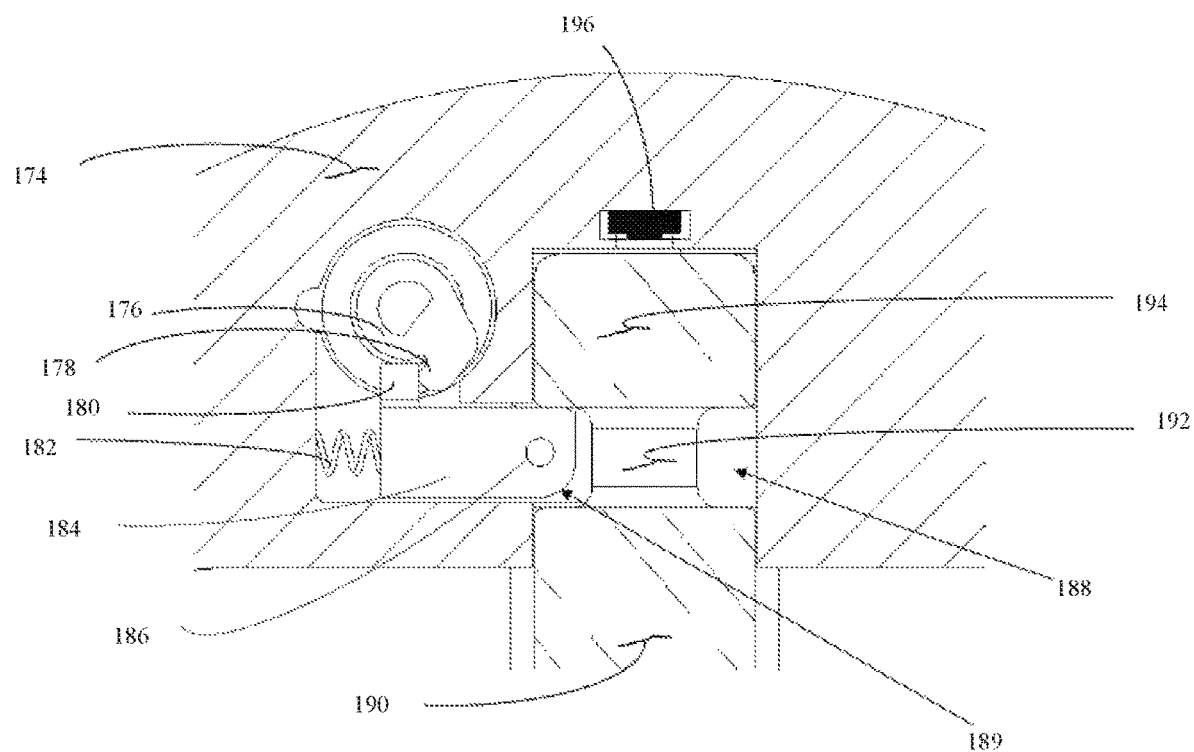
FIG. 10 is a cross-sectional view of an electronic locking assembly of a puck lock assembly, according to an embodiment of the present disclosure; and, FIG. 11 is a functional diagram of an electronic locking assembly of a puck lock system, according to an embodiment of the present disclosure.

FIG. 10 illustrates an intelligent sensor system that is capable of understanding the state of the shackle bolt 152, a blocker 184 and the position of lock 122 on hasp 124. A bolt head 194 of lock bolt 152 is seated within a cavity 188 formed in lock body 174 and abuts a position switch system 196 when bolt head 194 is fully inserted within lock 122. A motor is attached to a cam 176 having an arm 178 that rotates in a clockwise direction to push blocker arm 180 away from lock bolt 152 against a spring 182 positively biasing blocker 184 forward into a cavity 188 formed by a tampered section 192 of lock bolt 152. A bottom portion 190 of lock bolt 152 has the same circumference as bolt head 194. At least one pair of blocker magnets 186 in blocker 184 and their respective Hall effect sensors indicate whether blocker 184 is in a locked or unlocked position. When lock bolt 152 is pushed into the lock body of lock 122, bolt head 194 pushes against a rounded surface 189 of blocker 184 to laterally move blocker 184 against the force of spring 182. Once lock bolt 152 pushes blocker 184 out of cavity 188, the force of spring 182 pushes blocker 184 into cavity 188 against tapered portion 192 of lock bolt 152. With this configuration, lock 122 does not require any power to fully engage lock bolt 152 into a locked state, thereby saving battery power while still allowing lock 122 to secure an enclosure.

Figure 11:
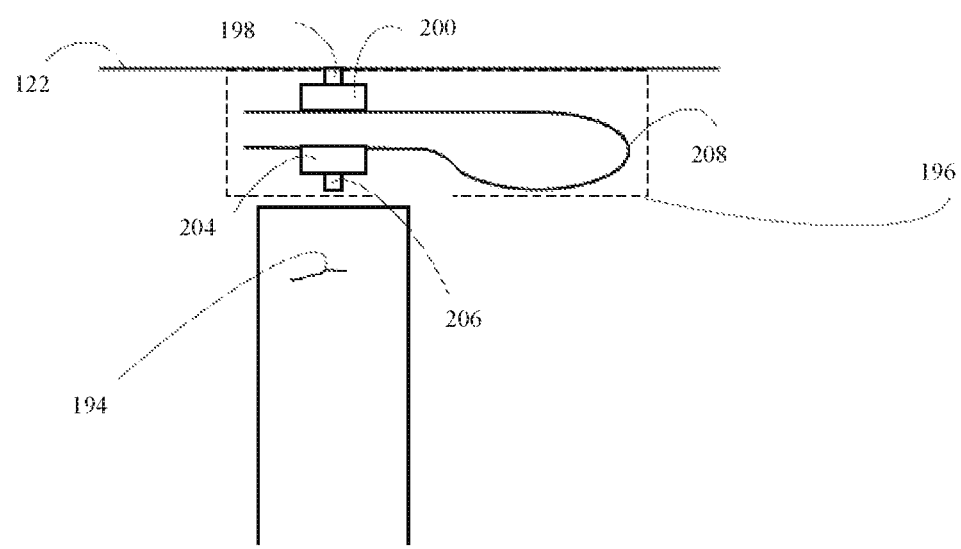

In FIG. 11, position switch system 196 includes a position switch actuator 206 coupled to a bottom position switch 204, a position switch actuator 198 coupled to a top position switch 200, and a flexible substrate 208 connected therebetween. The force required to actuate top position switch 200 is greater than the force required to actuate bottom position switch 204 based on the force exerted from bolt head 194 when lock bolt 152 is pushed upwardly into lock 122. In operation, bottom position switch 204 indicates a locked position and top position switch 200 is used to power on or wake up control module 110 which requires a user exerting additional force on lock bolt 152 when locking lock 122.

As illustrated in FIGS. 1-11, the preferred embodiment of the present invention provides a sensing system capable of determining the position of blocker 184 based on magnets 186, whether lock bolt 152 is in a locked, unlocked, or power on/wakeup state, the position of puck lock 122 based on alignment of lock RF/IR circuit board 146 with hasp RF/IR circuit board 140.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting.

Further, the specification is not confined to the disclosed embodiments. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced items.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A method for electronic access control, the method comprising:
    establishing a communications interface between a mobile electronic device and an electronic lock assembly, the electronic lock assembly comprising a control module, a lock portion having a first wireless power interface and a hasp portion having a second wireless power interface,
        wherein the first wireless power interface of the lock portion is operably engaged with the second wireless power interface of the hasp portion;
    communicating, with the mobile electronic device, a transmission signal to the control module; and
    actuating, via the control module and in response to receiving the transmission signal, a locking mechanism from a locked state to an unlocked state, wherein the locked state comprises a mechanical locking interface between the lock portion and the hasp portion.

2. The method of claim 1 further comprising communicating, with the control module, a second transmission signal to the mobile electronic device in response to actuating the locking mechanism from the locked state to the unlocked state.

3. The method of claim 1 wherein the lock portion and the hasp portion are communicably engaged via a wireless communications interface.

4. The method of claim 3 wherein the lock portion directly communicates with the hasp portion via the wireless communications interface based on proximity of the lock portion to the hasp portion.

5. The method of claim 1 further comprising establishing a communications interface between the control module and a site integration module.

6. The method of claim 5 wherein the site integration module is interfaced with one or more alarm systems selected from the group consisting of security alarms, environmental alarms, networking alarms, and gas gauge alarms.

7. The method of claim 1 further comprising establishing, via a communications network, a communications interface between the mobile electronic device and a remote server.

8. A method for electronic access control, the method comprising:

establishing a wireless communications interface between a lock assembly and a hasp assembly, wherein the lock assembly comprises a control module and a first wireless communications interface and the hasp assembly comprises a second wireless communications interface;

engaging a locking bolt of the lock assembly with a receiving aperture of the hasp assembly to establish a locking mechanical interface between the lock assembly and the hasp assembly;

determining, with at least one sensor being communicably engaged with the control module, a lock state of the lock assembly and the hasp assembly;

establishing a communications interface between a mobile electronic device and the control module of the lock assembly;

communicating, with the mobile electronic device, a transmission signal to the control module; and actuating, via the control module and in response to receiving the transmission signal, the locking bolt from a locked state to an unlocked state.

9. The method of claim 8 further comprising communicating, with the control module, a transmission signal indicative of the lock state to the mobile electronic device.

10. The method of claim 8 further comprising establishing, via a communications network, a communications interface between the mobile electronic device and a remote server.

11. The method of claim 8 further comprising providing a power supply from the hasp assembly to the lock assembly, wherein the hasp assembly comprises a first wireless power interface and the lock assembly comprises a second wireless power interface.

12. The method of claim 8 wherein the lock assembly directly communicates with the hasp assembly via the wireless communications interface based on proximity of the lock assembly to the hasp assembly.

13. The method of claim 8 further comprising establishing a communications interface between the control module and a site integration module.

14. The method of claim 13 wherein the site integration module is interfaced with one or more alarm systems selected from the group consisting of security alarms, environmental alarms, networking alarms, and gas gauge alarms.

15. A method for electronic access control, the method comprising:

establishing a wireless communications interface between a lock assembly and a hasp assembly,
wherein the hasp assembly comprises a first wireless power interface and a first wireless communications interface, and
wherein the lock assembly comprises a control module, a second wireless communications interface, a second wireless power interface, and a battery;

establishing a communications interface between a mobile electronic device and the control module of the lock assembly;

determining, with at least one sensor being communicably engaged with the control module, a lock state of the lock assembly and the hasp assembly;

communicating, with the mobile electronic device, a transmission signal to the control module; and actuating, via the control module and in response to receiving the transmission signal, a locking mechanism from a locked state to an unlocked state, wherein the locked state comprises a mechanical locking interface between the lock assembly and the hasp assembly.

16. The method of claim 15 wherein the first wireless power interface of the hasp assembly is operably engaged with the second wireless power interface of the lock assembly.

17. The method of claim 15 further comprising establishing, via a communications network, a communications interface between the mobile electronic device and a remote server.

18. The method of claim 17 further comprising establishing a communications interface between the control module and a site integration module.

19. The method of claim 15 wherein the lock assembly directly communicates with the hasp assembly via the wireless communications interface based on proximity of the lock assembly to the hasp assembly.

20. The method of claim 18 wherein the site integration module is interfaced with one or more alarm systems selected from the group consisting of security alarms, environmental alarms, networking alarms, and gas gauge alarms.

* * * * *